June 27, 1967  T. R. BLACK  3,327,644
OVERHEAD CONVEYOR
Filed Nov. 25, 1964  4 Sheets-Sheet 1
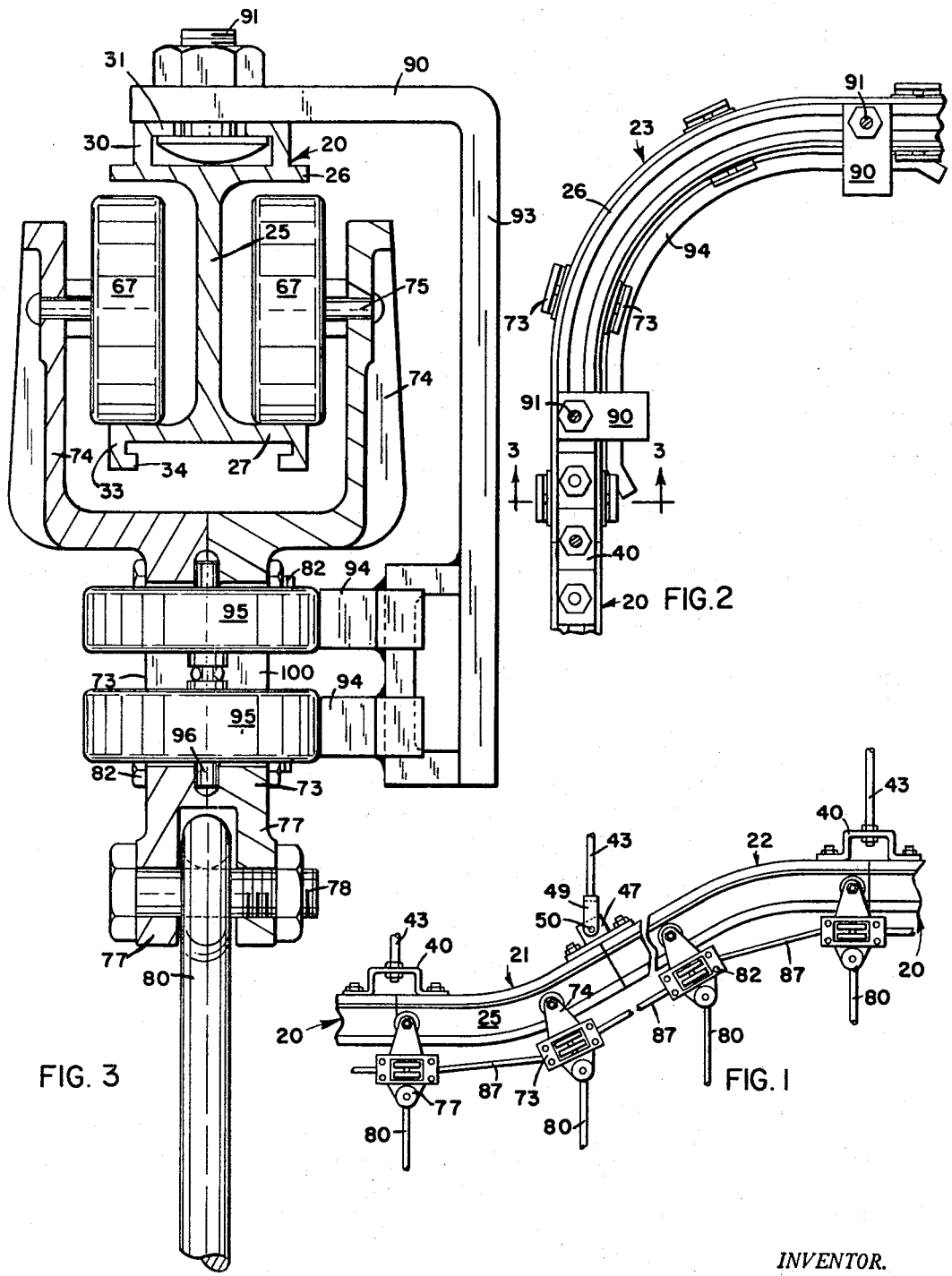
INVENTOR.
THEODORE R. BLACK.
BY
D. Emmett Thompson
ATTORNEY.

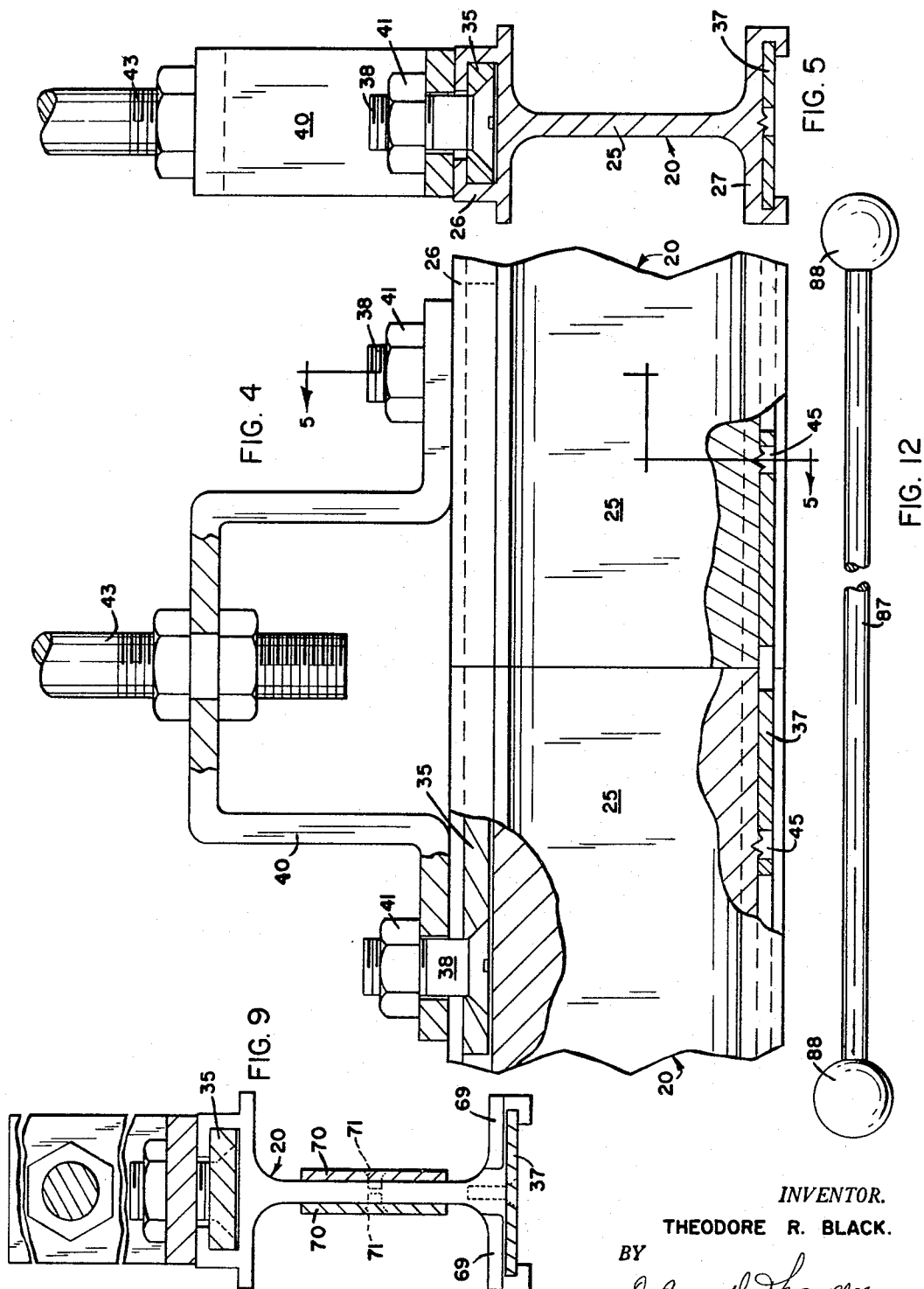

June 27, 1967 T. R. BLACK 3,327,644
OVERHEAD CONVEYOR
Filed Nov. 25, 1964 4 Sheets-Sheet 3
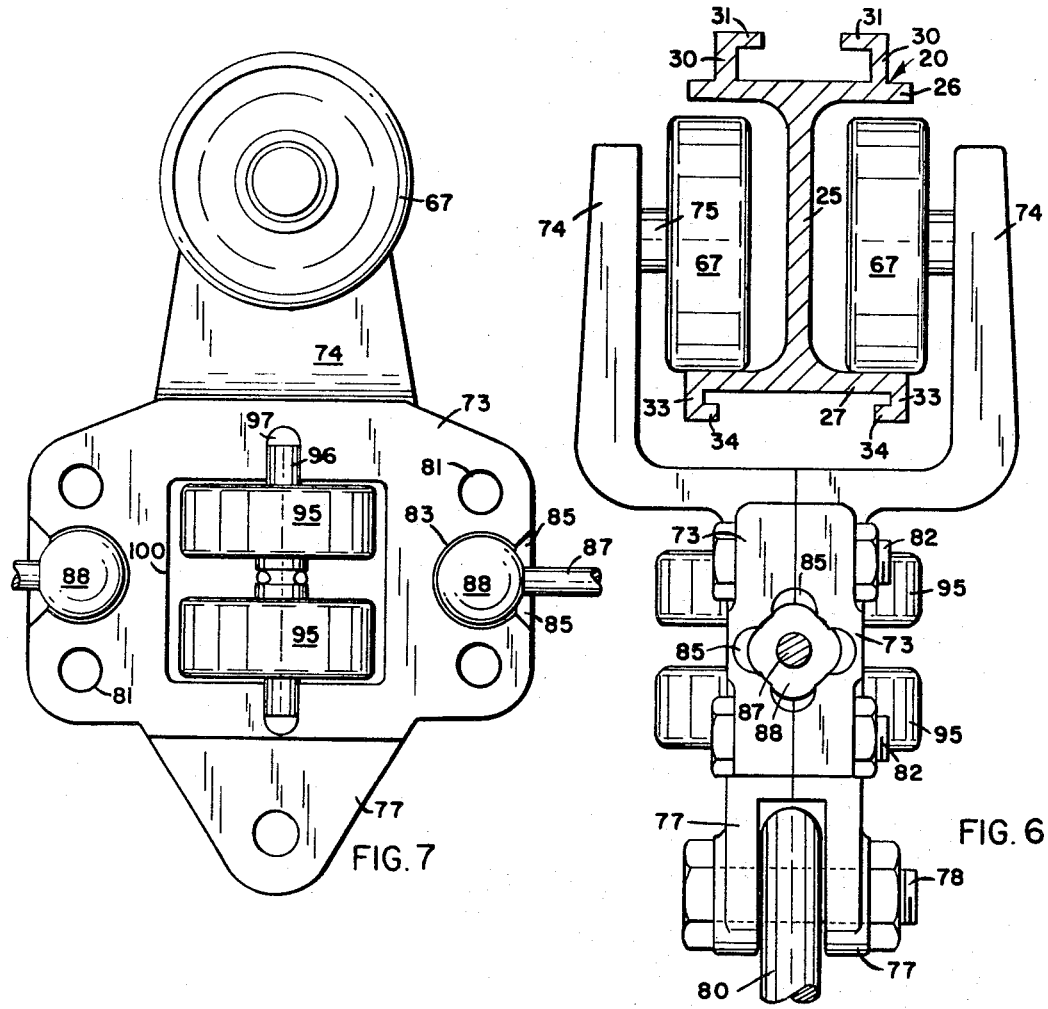
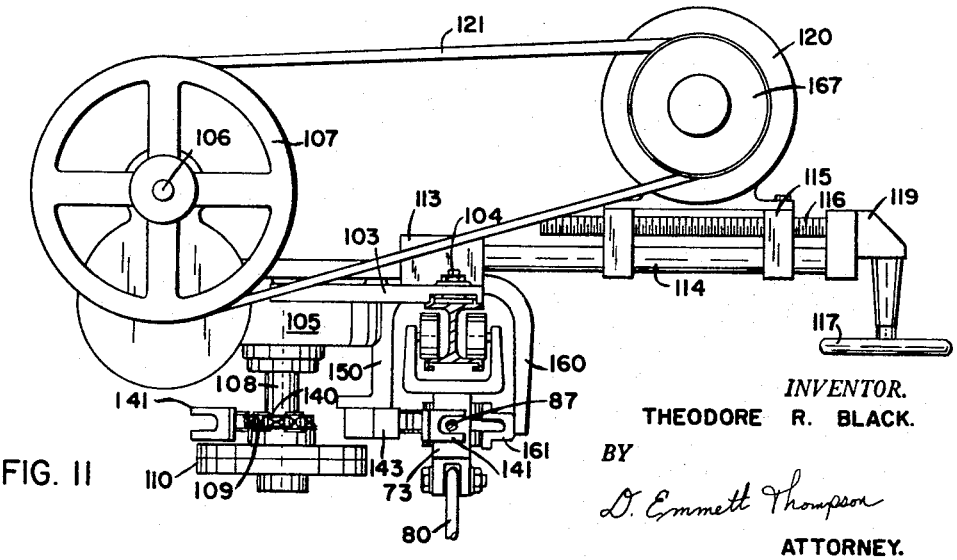
FIG. 7
FIG. 6
FIG. 11
INVENTOR.
THEODORE R. BLACK.
BY
D. Emmett Thompson
ATTORNEY.

June 27, 1967

T. R. BLACK 3,327,644

OVERHEAD CONVEYOR

Filed Nov. 25, 1964

INVENTOR.
THEODORE R. BLACK.
BY
D. Emmett Thompson
ATTORNEY.

United States Patent Office 3,327,644
Patented June 27, 1967

3,327,644
OVERHEAD CONVEYOR
Theodore R. Black, Dayton, Ohio, assignor, by mesne assignments, to Diebold Incorporated, Canton, Ohio, a corporation of Ohio
Filed Nov. 25, 1964, Ser. No. 413,795
6 Claims (Cl. 104—106)

This invention relates to an overhead conveyor and has as an object a rail structure consisting of a series of sections connected in end to end arrangement, the sections being adapted for economical production by the extrusion method, and means for conveniently joining the sections in accurate and fixed alignment, all whereby the rail structure may be quickly and conveniently erected, including curved section to provide both horizontal and vertical bends in the rail structure.

The invention has as a further object a rail structure for overhead conveyor systems incorporating a structural arrangement to provide for the convenient takeup, or extension, of the rail structure. The invention has as a further object a novel drive mechanism detachably and adjustably mounted on the rail structure for imparting movement to the conveyor trollies.

The invention consists in the novel features and constructions hereinafter set forth and claimed.

In describing the invention, reference is had to the accompanying drawings in which like characters designate corresponding parts in all the views.

In the drawings—

FIGURE 1 is a side elevational view of a portion of an overhead conveyor embodying my invention.

FIGURE 2 is a top plan view showing a curved view in the rail structure.

FIGURE 3 is an enlarged sectional view taken on line 3—3, FIGURE 2.

FIGURE 4 is an enlarged side elevational view at the joinder of two rail sections, with parts broken away and parts in section.

FIGURE 5 is a view taken on line 5—5, FIGURE 4.

FIGURE 6 is an end elevational view of a trolley with the supporting rail shown in section.

FIGURE 7 is an inner face view of a mating trolley section.

FIGURE 9 is a view taken on line 9—9, FIGURE 8.

FIGURE 11 is a view looking to the left, FIGURE 10.

FIGURE 12 is a view of one of the trolley tie rods.

Figures 8, 10:
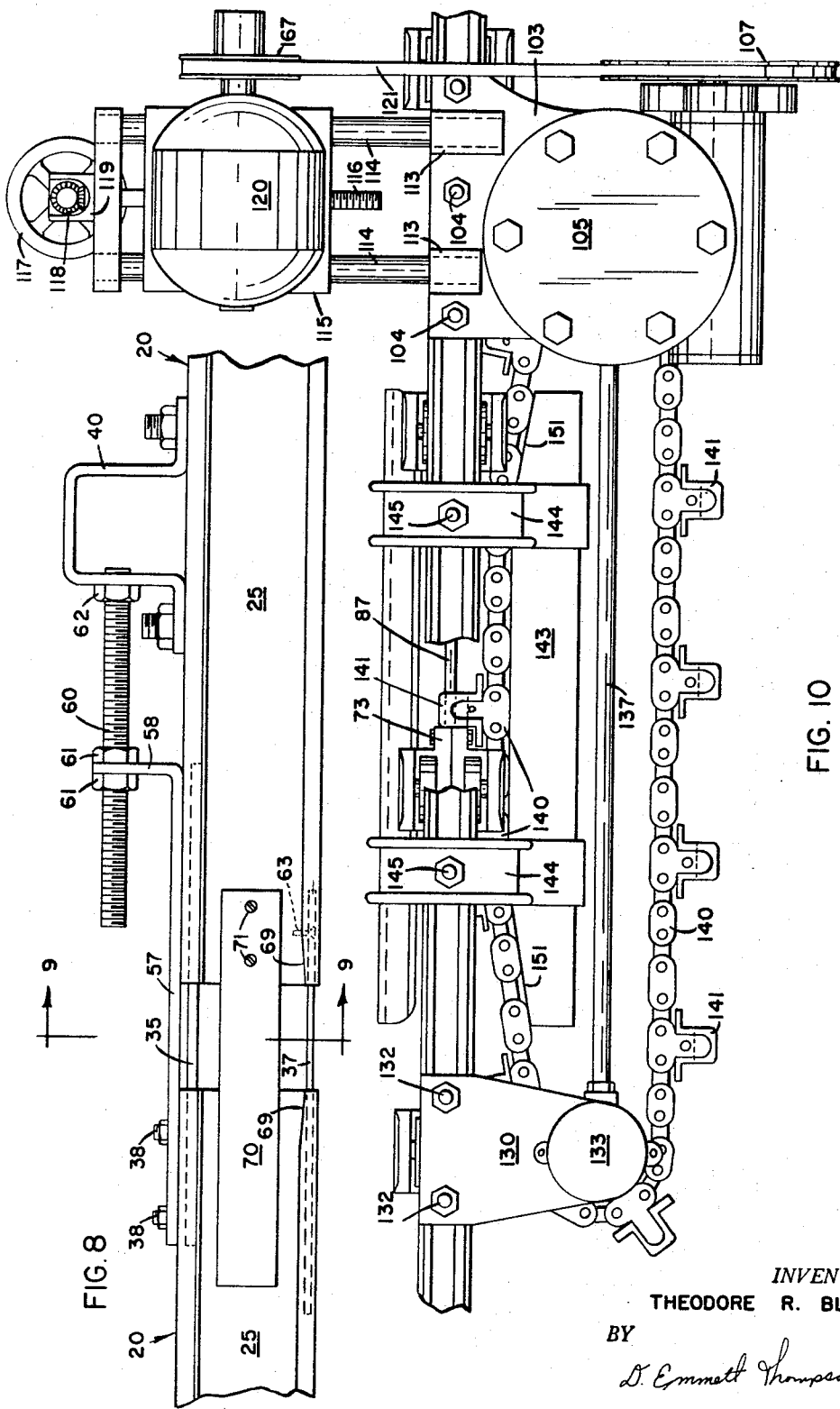
FIGURE 8 is a side elevational view of a takeup section in the rail structure.
FIGURE 10 is a top plan view including the drive mechanism.

The conveyor system of my invention consists generally of an overhead supporting rail structure, which consists of a plurality of straight rail sections, and a plurality of curved sections, whereby the rail structure provides an endless path for the movement of a series of load supporting trollies along the rail structure. The trollies are connected together and uniformly spaced apart by tie rods, the ends of which are connected to the trollies to permit universal movement of the trollies as they pass around the curved sections of the conveyor rail, which curved sections provide for bends in the rail structure in both the horizontal and vertical planes. A drive mechanism is mounted on the rail structure, and consists of an endless chain having spaced driving lugs, which engage the trollies to effect movement thereof along the rail structure.

A portion of the conveyor system is shown in FIGURE 1 in which the straight rail sections 20 are connected by vertically disposed curved sections, including a bottom bend section 21 and an upper bend section 22. In FIGURES 2 and 3, the straight rail sections 20 are connected by a curved section 23 disposed in a horizontal plane.

The conveyor sections 20, 21, 22, 23 are economically formed by the extrusion process, and each section consists of a vertically disposed central web portion 25 formed with upper and lower flanges 26, 27. The upper flange 26 is formed with a lengthwise extending T slot. This slot being formed by vertically disposed flanges 30 having inwardly turned ends 31, see FIGURES 3 and 6.

The lower flange 27 is also formed with a T slot extending lengthwise of the section by means of depending flanges 33 having inturned end portions 34.

The rail sections 21, 22, 23 are joined together in end to end relation, and maintained in accurate alignment, by an aligning plate 35 positioned in the T slot in the upper flange 26, and an alignment plate 37 positioned in the T slot in the lower flange 27. The upper alignment plate 35 is provided with bolts 38 extending upwardly through the upper T slot for the reception of a U-shaped hanging bracket 40, FIGURE 4; the bracket bridging the joinder between the sections 20 and being tightly clamped against the flanges 31 at the top of the rail by nuts 41 threaded on the bolts 38. The brackets 40 are provided with a central aperture to receive a hanger rod 43, the upper end of which is fastened to the ceiling or some other suitable support.

The lower aligning plate 37, bridging the joinder between the abutting rail sections, is restrained against lengthwise movement as by upsetting the bottom wall of the lower T slot into apertures 45 formed in the plate 37. Immediate the ends of the sections, the rail structure may be supported by the use of additional plates 35 and brackets 40 to provide adequate support for the rail structure, comparable to the load to be placed on the conveyor.

Where vertically curved sections, as 21, 22, in FIGURE 1 are joined, the supporting bracket, instead of being of U formation as shown in FIGURE 4, is provided with a lug 47. The hanger rod 43 is provided, on its lower end, with a bifurcated member 49, which is attached to the lug 47 as by a pin 50. This arrangement is employed due to the inclination of the rail at the joinder of the curved sections 21, 22. The opposite ends of these sections extend in horizontal relation, accordingly they may be attached by the U-shaped brackets 40. In like manner, the horizontally disposed curved sections 23 are joined to the straight sections by the arrangement shown in FIGURE 4.

The rail structure includes an arrangement for conveniently adjusting the length of the rail structure. Referring to FIGURES 8 and 9, the end portion of the alignment plate 35, extending into the T slot of one rail section 20, is provided with a pair of bolts 38, which extend through apertures formed in a plate 57, which bridges the space between the sections 20, and overlaps the adjacent section. The unattached end of the plate 57 has an upwardly extending flange 58 apertured to receive an adjustment bolt 60, which is threaded to receive adjusting nuts 61 on opposite sides of the flange 58. One end of the bolt is threaded into a hanger bracket 40 fixedly mounted on the adjacent rail section. The screw 60 is fixed by jam nut 62.

The alignment plate 37 in the lower T slot is fixed to one of the sections 20 as by a screw 63. For example, referring to FIGURE 8, the left hand portion of the alignment plate 37 is slidably mounted in the lower T slot of the left rail section 20. The right hand portion of the upper aligning plate 35 is slidably mounted in the upper T slot of the right hand section 20. Adjustment of the nuts 61, along with screw 60, will effect movement of the plate 57 in a direction lengthwise of the right hand rail section 20, and because this plate is fixedly secured to the left hand rail section 20 by bolts 38, relative lengthwise movement between these two rail sections will be effected to lengthen or shorten the rail structure.

There are a series of load trollies provided with rollers 67 for movement along the lower flanges 27 of the rail sections, see FIGURES 6 and 7. The lower alignment plate 37 bridging the gap between adjacent rail sections in the takeup mechanism, FIGURES 8 and 9, provides a support for the trolley rollers 67 in passing from one of these rail sections to the other. The movement of the rollers in this area is facilitated by forming the lower rail flanges 27 with inclined surfaces 69, see FIGURE 8. Also, to prevent any possibility of the rollers 67 engaging the end edges of the web portions 25 of the rail sections, plates 70 are mounted on opposite sides of the webs 25, and are fixedly secured to the web of one rail section as by screw 71, the plate 70 bridging the gap between the separated rail sections.

The trollies are each formed by a pair of complemental mating sections, each having a body portion 73 and an upwrdly extending and laterally outwardly displaced arm 74. The rollers 67 are mounted on studs 75 secured to the upper end portions of the arms 74. Each trolley section is formed with a depending lug portion 77 apertured to receive a pin or bolt 78, which serves to attach a load supporting rod 80 to each trolley assembly. The mating sections are formed with apertures 81 to receive bolts 82 to clamp the mating sections together to form the trolley assembly.

Each mating section is formed, at each end of the body portion 73, with a hemispherical concavity 83 and inclined recesses 85 opening through the ends of the body portion. The trollies are connected together by tie rods 87, to each end of which there is fixedly secured a ball head 88. The ball heads 88 are positioned in the hemispherical recesses 83 of the mating sections, which in the assembled trolley form a spherical recess. With this arrangement, the trollies may move about both a vertical and horizontal axis, as when the trollies move about curved sections as 21, 22, 23. The tie rods 87 serve to maintain the trollies in uniform spaced relation during their movement along the rail structure, and to transmit propulsion force from one trolley to the next.

The horizontal disposed curved sections 23 are provided with brackets 90, fixed to the top of the rail section by bolts 91 positioned in the upper T slot of the section. Each of these brackets is formed with a depending arm 93, see FIGURE 3, to the lower end of which are fixedly secured a pair of guide rails 94 formed on the same curvature as the section 23, and located to be engaged by a pair of guide rollers 95 journalled on a pin 96, the ends of which are positioned in complemental recesses 97 formed in the mating trolley sections. Each body portion 73 of the mating trolley section is formed with a rectangular opening 100, and the rollers 95 are of such diameter that they extend laterally through the openings 100 for engagement with the guide rails 94, whereby the trollies are guided about the curved sections 23.

A drive mechanism, shown in FIGURES 10 and 11, is provided to effect movement of the endless series of trollies along the rail structure. This drive mechanism consists of a plate 103 secured to the upper flange of a rail section, by bolts 104 positioned in the T slot of the upper rail flange. A gear housing 105 is secured to the plate 103, and contains worm gear reduction, having an input shaft 106 on which is mounted a pulley 107. The output shaft 108 of the gear reduction is vertically disposed, and provided on its lower end with a sprocket 109, operatively connected to the output shaft 108, by an overload clutch mechanism 110, see FIGURE 11.

The plate 103 is formed with bosses 113, in each of which there is fixedly mounted a rod 114. A motor support 115 is slidably mounted on the rods 114 and is moved lengthwise thereof by an adjusting screw 116 operated by a hand wheel 117, through beveled gearing 118, contained in a housing 119, journalled on the end of screw 116. With this arrangement, a motor 120, mounted on the support 115, may be moved toward and from the pulley 107 to maintain proper tension on a drive belt 121.

There is a plate 130, also detachably mounted on the upper flange of the rail sections, as by bolts 132. A housing 133 is fixed to the outer end of the plate 130, and a shaft 133 is vertically journalled in this housing and carries at its lower end an idle sprocket. There is an adjustment rod 137 extending between the worm gear housing 105, and the housing 133, to adjust the latter toward and from the housing 105 to maintain proper tension on a drive chain 140, trained about the sprocket 109 and the idler sprocket. The drive chain 140 is provided with a series of driving lugs 141. The inner run of the chain 140 has a portion moving paralled to, and in close adjacency to, the conveyor rail. This is effected by a guide shoe 143 supported by brackets 144, also clamped to the top of the rail section as by bolts 145. The brackets 140 are formed with depending arms 150, see FIGURE 11, to which the guide shoe 143 is secured. The end portions of the inner side of the guide shoe 143 are inclined as at 151, FIGURE 10. The spacing of the drive lugs 141 is comparable to the spacing of the trolleys as determined by the length of the tie rods 87. The driving lugs 141 are bifurcated to receive the tie rods 87, and the spacing of the driving lugs 141 on chain 140 is such that the driving lugs engage the rear edges of the body portions 73 of the trolleys. The guide shoe 143 serves to make certain the proper engagement of the lugs with the trolleys. With this arrangement, continuous motion is imparted to the endless series of trolleys to effect movement thereof along the supporting rail structure.

To prevent any lateral displacement of the trollies, during engagement by the driving lugs, the brackets 140 are also provided with outer depending arms 160, to the lower ends of which is fixedly secured a straight track section 161, see FIGURE 11, U-shaped in cross section for engagement by the vertically journalled guide rollers 95. With this arrangement, the trollies are moved along the rail by the lugs 141, which exert pressure against the trollies in a direction lengthwise of the rail. If the drive pulley 167 on the motor 120 is of the variable sheave type, the speed of the movement of the trollies can be readily varied by operation of the hand wheel 117.

It will be noted that this drive mechanism may be conveniently mounted on any straight rail section in the conveyor system, and it can be adjusted to any position along the rail sections.

It will be observed that my rail structure is particularly convenient to install and the rail sections are automatically aligned and kept in alignment by the alignment plates 35, 37. The T slot and aligning plate structure avoids the necessity of any drilling or any machining of parts during the installation of the conveyor system.

What I claim is:

1. An overhead conveyor rail structure comprising a series of rail sections joined together in end to end relation, each of said rail sections comprising an extrusion having a vertically disposed central web portion formed with upper and lower flanges extending laterally from opposite sides of said web, said upper flange being formed with a T slot in its upper surface and said lower flange being formed with a T slot in its lower surface, said T slots extending lengthwise of said rail section, flat aligning plates positioned in said upper and lower T slots at the joinder of said sections, said plates extending from the T slot in one section into the T slot in the adjacent section, a bridging member mounted on the upper flanges of said joining sections and bridging the joinder therebetween, screw means extending between the aligning plate in said upper T slots and said bridging member and operable to clamp said bridging member to said sections.

2. An overhead conveyor rail structure, as defined in claim 1, having means to restrain lengthwise movement of the aligning plate in said lower T slots.

3. An overhead conveyor rail structure comprising a series of rail sections joined together in end to end relation, each of said rail sections comprising an extrusion having a vertically disposed central web portion formed with upper and lower flanges extending laterally from opposite sides of said web portion, said upper and lower flanges being formed with T slots extending lengthwise of said sections, aligning plates positioned in the T slots of the upper and lower flanges of one of a pair of adjoining rail sections, said aligning plates extending into T slots of the other adjoining rail section, each of said plates being fixed to one of said rail sections and having sliding engagement with the other of said rail sections, a plate fixed to each side of the web portion of one of said adjoining rail sections and overlapping the web portion of the other adjoining rail section, and rail adjusting means connected to said adjoining rail sections and operable to effect lengthwise movement of one of said rail sections toward and from the other.

4. An overhead conveyor rail structure comprising a series of rail sections joined together in end to end relation, each of said rail sections comprising an extrusion having a vertically disposed central web portion formed with upper and lower flanges extending laterally from opposite sides of said web portion, said upper and lower flanges being formed with T slots extending lengthwise of said sections, an aligning plate positioned in the T slots in the upper and lower flanges of one section and extending into the T slots of the upper and lower flanges of an adjoining section, an adjusting bar positioned on the upper flanges of said adjoining rail sections, one end portion of said bar and one end portion of said aligning plates being fixedly secured to one rail section, and means carried by the adjoining second rail section and operatively connected to said bar for effecting movement of said bar and said one rail section toward and from said second rail section.

5. An overhead conveyor including a rail structure comprising a series of rail sections joined together in end to end relation, each of said rail sections comprising an extrusion having a vertically disposed central web portion formed with upper and lower flanges extending laterally from opposite sides of said web, said upper flange being formed with a T slot in its upper surface and said lower flange being formed with a T slot in its lower surface, said T slots extending lengthwise of said rail section, flat aligning plates positioned in said upper and lower T slots at the joinder of said sections, said plates extending from the T slot in one section into the T slot in the adjacent section, a bridging member mounted on the upper flanges of said joining sections and bridging the joinder therebetween, screw means extending between the aligning plate in said upper T slots and said bridging member and operable to clamp said bridging member to said sections, a series of trollies, each having a pair of rollers positioned at opposite sides of said web portion for movement along the lower flanges of said rail sections, tie rods connecting said trollies and maintaining the same in uniform spaced relation, a drive unit positioned on the upper flange of one of said rail sections and being detachably clamped thereto for adjustment therealong by bolts in the T slot of said upper flange, said drive unit including a drive sprocket and an idler sprocket, said sprockets being spaced apart at one side of said rail section and mounted for rotation about vertical axes, a drive chain trained about said sprockets and having an inner run extending in close parallel adjacency to said rail section, said chain being provided with driving lugs spaced complemental to the spacing between said trollies for engaging the same, said drive mechanism further including a driving motor operatively connected to said driving sprocket.

6. An overhead conveyor structure as defined in claim 5, and including a guide shoe detachably mounted on said rail section intermediate said sprockets, said guide shoe serving to maintain the inner run of said drive chain in parallel adjacency to said rail, and a second drive shoe detachably mounted on said rail section and positioned at the opposite side thereof for engagement by said trollies to prevent lateral movement thereof during engagement by said driving lugs.

References Cited

UNITED STATES PATENTS

| | | | |
|---|---|---|---|
| 426,877 | 4/1890 | Stream | 238—10 |
| 1,752,566 | 4/1930 | McClary | 238—151 X |
| 1,876,373 | 9/1932 | Whitney | 104—91 |
| 2,371,624 | 3/1945 | Hudson. | |
| 2,569,947 | 10/1951 | Orwin | 104—91 X |
| 3,095,174 | 6/1963 | Dehn et al. | 104—111 X |

FOREIGN PATENTS

| | | |
|---|---|---|
| 485,968 | 8/1952 | Canada. |
| 545,742 | 6/1945 | Great Britain. |

ARTHUR L. LA POINT, *Primary Examiner.*

J. E. BABER, *Assistant Examiner.*